United States Patent
Raehse et al.

(10) Patent No.: US 6,769,200 B2
(45) Date of Patent: Aug. 3, 2004

(54) DEVICE FOR SPRAY-DRYING SOLVENT-CONTAINING COMPOSITIONS

(75) Inventors: Wilfried Raehse, Duesseldorf (DE); Ovidiu Dicoi, Monheim (DE); Peter Walzel, Dormagen (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/275,533

(22) PCT Filed: Apr. 24, 2001

(86) PCT No.: PCT/EP01/04610

§ 371 (c)(1),
(2), (4) Date: Nov. 4, 2002

(87) PCT Pub. No.: WO01/83071

PCT Pub. Date: Nov. 8, 2001

(65) Prior Publication Data

US 2003/0141378 A1 Jul. 31, 2003

(30) Foreign Application Priority Data

May 3, 2000 (DE) ......................................... 100 21 539

(51) Int. Cl.⁷ .................................................. F26B 3/08
(52) U.S. Cl. .............................. 34/372; 34/348; 34/404
(58) Field of Search .......................... 34/343, 348, 360, 34/363, 368, 372–373, 386, 402–404, 576, 578, 586, 165–168, 177

(56) References Cited

U.S. PATENT DOCUMENTS

| | | | | |
|---|---|---|---|---|
| 3,286,992 A | * | 11/1966 | Armeniades et al. | ........ 366/339 |
| 3,320,220 A | | 5/1967 | Di Drusco et al. | |
| 3,450,494 A | | 6/1969 | Gaiser | |
| 3,847,022 A | * | 11/1974 | McGinnis | ................ 73/863.12 |
| 4,144,226 A | | 3/1979 | Crutchfield et al. | |
| 4,146,495 A | | 3/1979 | Crutchfield et al. | |
| 4,770,236 A | * | 9/1988 | Kulikowski | .................. 165/86 |
| 5,232,550 A | | 8/1993 | Takashi et al. | |
| 5,431,780 A | | 7/1995 | Raehse et al. | |
| 5,462,692 A | * | 10/1995 | Roesler et al. | ................ 424/64 |
| 5,723,433 A | | 3/1998 | Duvall et al. | |
| 6,339,126 B1 | * | 1/2002 | Barkac et al. | ................ 525/66 |
| 6,342,210 B1 | * | 1/2002 | Cai et al. | ....................... 424/65 |
| 6,361,990 B1 | * | 3/2002 | Porter et al. | ............. 435/256.8 |

FOREIGN PATENT DOCUMENTS

| | | |
|---|---|---|
| EP | 0 816 291 | 4/2001 |
| JP | 55-86501 | 6/1980 |
| WO | WO 96/04973 | 2/1990 |
| WO | WO 92/05849 | 4/1992 |

OTHER PUBLICATIONS

Patent Abstract of Japan, vol. 004, No. 135, dated Sep. 1980 for JP 55 086501.
K. Masters, "Spray Drying Handbook", Longman Scientific & Technical 1991, ISBN 0–582–06266–7.
Donald W. Breck, Zeolite Molecular Sieves, John Wiley & Sons, New York, London, Sydney, Toronto, pp. 92 (1974).
Donald W. Breck, Zeolite Molecular Sieves, John Wiley & Sons, New York, London, Sydney, Toronto, pp. 145, 176, 177 (1974).

* cited by examiner

*Primary Examiner*—Ira S. Lazarus
*Assistant Examiner*—Andrea M. Ragonese
(74) *Attorney, Agent, or Firm*—Stephen D. Harper; Glenn E. J. Murphy

(57) ABSTRACT

An apparatus and method for the spray drying of solvent-containing compositions. A liquid or paste-form solvent-containing composition is heated to a temperature above the boiling point of the solvent, transported under excess pressure and at a temperature above the boiling point of the solvent to a relaxation space where it is sprayed to evaporate the solvent. The relaxation space is not under excess pressure and is at a temperature that is above the boiling point of the solvent.

7 Claims, 1 Drawing Sheet

DEVICE FOR SPRAY-DRYING SOLVENT-CONTAINING COMPOSITIONS

CROSS-REFERENCE TO RELATED APPLICATIONS

This application is a U.S. National Stage application filed under 35 U.S.C. §371, claiming priority of International Application No. PCT/EP01/04610, filed Apr. 24, 2001 in the European Patent Office, and DE 100 21 539.4, filed May 3, 2000 in the German Patent Office, under 35 U.S.C. §§119 and 365.

BACKGROUND OF THE INVENTION

This invention relates to an apparatus for the spray drying of solvent-containing compositions, to a process for the spray drying of solvent-containing compositions and to uses of the apparatus according to the invention or the process according to the invention, more particularly for the production of powder-form detergents.

Apparatus for the spray drying of solvent-containing compositions, more particularly water-containing compositions, are known from the prior art.

Widely used apparatus include, for example, spray drying towers with spray nozzles which may be used in particular for converting liquid educts (solutions, suspensions or melts) into a powder-form product. In this case, the liquid is generally sprayed by pressure nozzles and then dries in a hot gas flowing in co-current or counter-current. The dry product is then removed through cyclones or filters. If a melt is sprayed and solidified in a cold gas, the tower used is known as a prilling tower.

Other known spray dryers are disk towers. Like nozzle towers, these are also short-time dryers. They use rotating disks for atomization and are compact compared with nozzle towers. The advantage of atomizing disks is that they are not affected by "nozzle" blockages or by highly variable liquid throughputs.

Spray dryers with an integrated fluidized bed are also known. Through the installation of a fluidized bed at the bottom of the spray drying tower, the product can be dried and graded there. The drying gas containing the fine dust is removed in the upper part of the tower at the head of the tower and, after separation, the fine dust is returned to the tower. Accordingly, even comparatively tacky and slow-drying educts can be processed. The end product is obtained in the form of readily dispersible agglomerates which are larger and hence generally lower in dust than the powders of the nozzle and disk towers.

Spray dryers in the broader sense also include fluidized bed spray granulators ("agglomeration dryers") which are used for the production of granules between 0.5 mm and several mm in size from sprayable solutions, suspensions and melts. Two-component nozzles are used for spraying. The product is generally abrasion-resistant and has a relatively high bulk density. Its dissolving rate is therefore lower than that of other spray dried products. Agglomeration granulators may also be used for coating granules in which case they are generally operated discontinuously.

A key application of spray dryers is the drying of water-based preparations of wetting agents, detergents and cleaners for the production of corresponding products in pourable, free-flowing form. In nozzle or disk spray drying towers operated on an industrial scale, the products are generally obtained at ambient pressure on the co-current or more often the counter-current principle. From the extensive specialist literature available, reference is made purely by way of example to K. Masters "Spray Drying Handbook", Longman Scientific & Technical 1991, ISBN 0-582-06266-7 and to the literature references cited at the internet address "http://home.t-online.de/home/michael.schoenherr/trocknung_5.htm".

A process for the spray drying of useful materials and mixtures thereof using superheated steam is known from WO 92/05849. The use of superheated steam avoids oxidative damage to the material to be dried.

WO 96/04973 describes a process for the spray drying of water-containing useful material preparations from the field of wetting agents, detergents and cleaners which avoids caking on the inner wall of the dryer through the introduction of a powder-form auxiliary into the interior of the spray drying zone.

U.S. Pat. No. 5,723,433 describes a process for the removal of solvents from a paste-form surfactant compound which comprises introducing the paste-form compound under pressure into a drying duct and reducing the pressure at the duct entrance to such an extent that certain components of the paste-form compound undergo flash evaporation. The paste-form compound is heated in the drying duct and is driven through the duct by the gases released during flash evaporation. The end product of the process is a concentrated surfactant paste which is obtained at the outlet end of the drying duct.

Known processes for the spray drying of liquid or paste-form compositions are unfavorably characterized by a very high energy consumption. The energy input is largely used not for solvent evaporation, but rather to cover heat losses attributable, for example, to the warm waste gas.

Another disadvantage is that, in the spray drying of compositions susceptible to microbial contamination, the microorganisms present are not reliably destroyed because the compositions are generally only briefly heated and often only to a temperature below 100° C. in the mixing vessel of the spray dryer in order to preserve the useful materials present. Even if a very hot gas stream is used for drying, the particles are only exposed to the hot gas for seconds which is not sufficient to destroy many unwanted microorganisms. This microbial challenge is particularly problematical in the production of powders or granules which are intended for use in foods, cosmetics or pharmaceuticals. Another complicating factor is that, although many microorganisms do not proliferate in the dried product in the absence of water, they do not die off either, but form extremely resistant permanent forms, such as spores for example.

Accordingly, the dried product cannot be optically or olfactorily recognized as being contaminated. However, if it is re-contacted with water, for example dissolved in water, considerable microbial contamination can occur if the product is not used within a few hours.

Accordingly, the problem addressed by the present invention was to provide a spray dryer which would avoid the above-mentioned disadvantages of the prior art.

DESCRIPTION OF THE INVENTION

Figure 1:
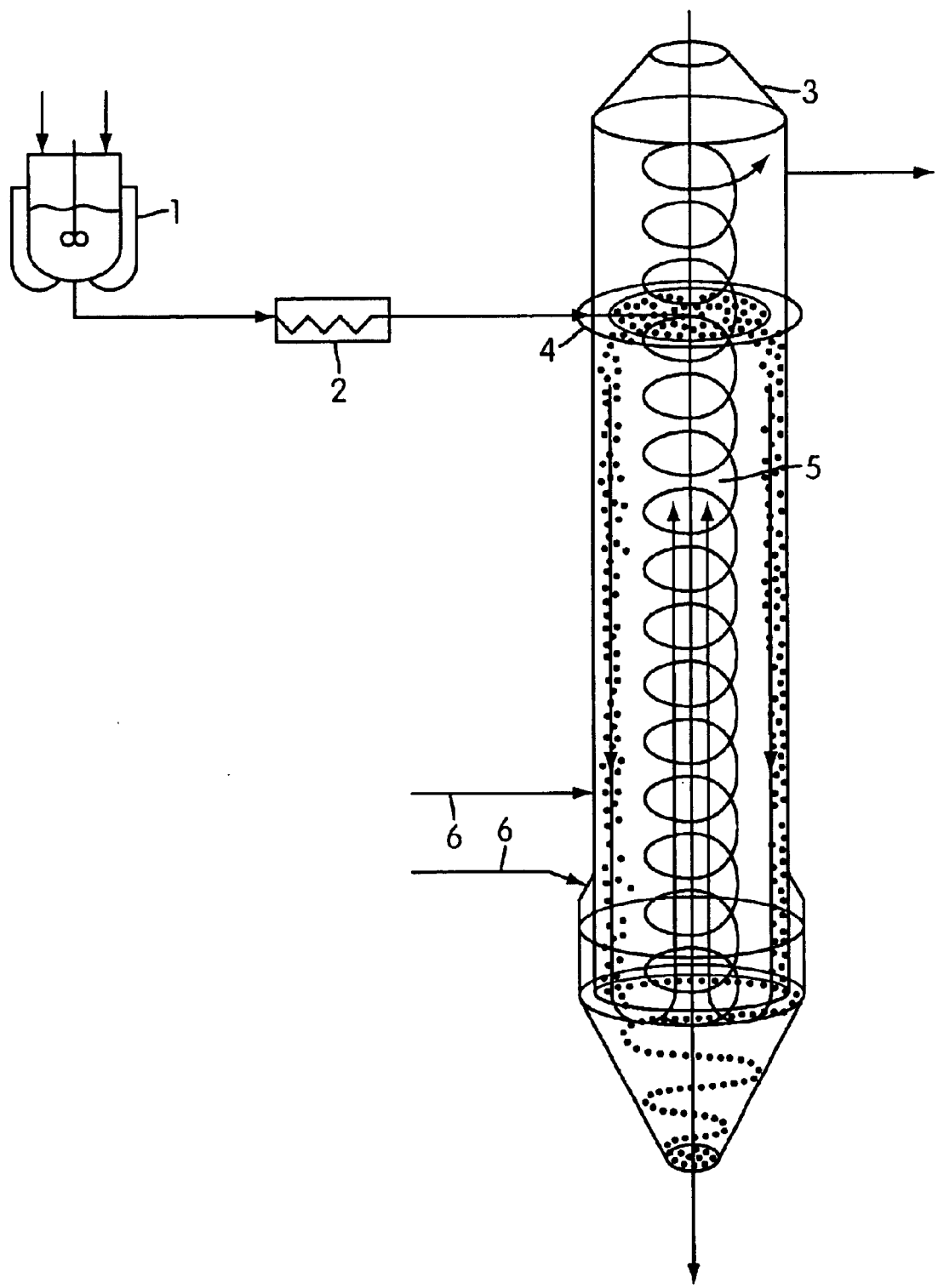
FIG. 1 illustrates the invention as embodied in a flash evaporation apparatus and process.

According to the invention, the problem stated above has been solved by an apparatus for the spray drying of solvent-containing compositions which comprises:

a) an inlet for a liquid or paste-form solvent-containing composition,
b) means for heating the liquid or paste-form solvent-containing composition to a temperature above the boiling point of the solvent,
c) means for transporting the liquid or paste-form solvent-containing composition heated in b) under excess pressure and at a temperature above the boiling point of the solvent,
d) means for spraying the liquid or paste-form solvent-containing composition heated in b) and transported under excess pressure in c) at a temperature above the boiling point of the solvent and
e) a relaxation space which is not under excess pressure and which accommodates the composition sprayed by d).

The energy demand of the apparatus according to the invention is advantageously lower than that of conventional spray dryers for the same transport performance. The energy saving is generally about 10% to about 35%.

In addition, the combined effect of the transport and spraying under excess pressure is that the composition to be dried undergoes pressure sterilization to a large extent, particularly if the suspension is heated above 150° C.

During spraying under excess pressure into the relaxation space which is not under excess pressure, the solvent or at least parts of the solvent undergo flash evaporation.

In the flash evaporation process, a liquid material stream is throttled to a relatively low pressure. The liquid partly evaporates and cools down in the process, i.e. the enthalpy of evaporation required for evaporation is taken from the residual liquid remaining and is not supplied from outside. In more detail, the flash evaporation process may be envisaged as taking place in such a way that, after the reduction in pressure, a large number of very small vapor bubbles is initially formed in the liquid. These vapor bubbles then grow in size until—given a sufficient residence time in the flash chamber—as much vapor is formed as exactly corresponds to the thermodynamic equilibrium.

The rapid fall in pressure has an additional sterilizing effect because it ruptures the cell membranes and/or cell walls of intact microorganisms and thus destroys the microorganisms.

Another surprising positive effect that can be observed in the use of the apparatus according to the invention for the drying of wetting agents, laundry detergents or cleaners lies in an increase in the so-called Berger whiteness of around 20% to around 70% and generally around 50% compared with conventionally spray-dried products.

A liquid or paste-form solvent-containing composition in the context of the present invention can be any useful solution or dispersion or combination of a solution and dispersion of a solid in the solvent.

The means b) of the apparatus according to the invention may basically be any heat source which is suitable for heating the liquid or paste-form solvent-containing composition to a temperature above the boiling point of the solvent. Suitable heat sources are, for example, gas burners, radiant heaters and, more particularly, heat exchangers.

The means b) and/or c) are preferably provided with a mixing unit, preferably with a standard dynamic or static mixer, more preferably with a static mixer and, in most particularly preferred embodiment, with a double-jacket static mixer.

The means d) of the apparatus according to the invention are selected in particular from spray nozzles, for example pneumatic spray nozzles, hollow cone nozzles, solid cone nozzles, flat jet nozzles, full jet nozzles or ultrasonic atomizers.

The temperature prevailing in the means b) to d) depends upon the nature of the solvent and the solvent-containing composition.

The solvent is preferably water. In this case, the temperature in the means b) to d) is above 100° C., preferably in the range from 100 to 240° C., more preferably in the range from 140 to 160° C. and, in one most particularly preferred embodiment, of the order of 150° C.

The excess pressure in the means c) and d) is also dependent on the nature of the solvent and the solvent-containing composition. If water is used as the solvent, as for example in the case of detergent slurries, the excess pressure is in the range from about 5 bar to about 60 bar, preferably in the range from about 20 bar to about 50 bar and more particularly in the range from about 30 bar to about 40 bar.

Normal pressure or reduced pressure, preferably normal pressure, prevails in the relaxation space e).

In a preferred embodiment of the present invention, features a) to e) are integrated into a spray drying tower.

In this embodiment of the invention, the atomized composition is carried in a stream of hot gas, more particularly in a stream of superheated steam as the hot gas, as described in WO 92/05849 to which reference is hereby made in its entirety.

Any compositions normally produced by spray drying are accessible to spray drying in the apparatus according to the invention, for example foods and luxury foods, pharmaceuticals, cosmetics, plant protection agents, plant treatment agents (for example fertilizers), building materials and building aids and paints, lacquers or polymers. Particular reference is made in this connection to the company brochures of Niro AIS, Copenhagen.

However, the apparatus according to the invention is preferably used in the production of powder-form, storage-stable, pourable and free-flowing laundry detergents or in the production of corresponding commercial forms of useful materials from that field, such as surfactants or surfactant-containing multicomponent mixtures.

Useful materials for direct or indirect use in the production of wetting agents, laundry detergents and/or cleaners using the apparatus according to the invention are described in general terms in the following with reference to typical components of modern laundry detergents.

Suitable anionic surfactants are, for example, soaps of natural or synthetic, preferably saturated fatty acids. Soap mixtures derived from natural fatty acids, for example coconut oil, palm kernel oil or tallow fatty acids are particularly suitable. Soap mixtures of which about 50 to 100% consist of saturated $C_{12-18}$ fatty acid soaps and about 0 to 50% of oleic acid soap are preferred. Other suitable synthetic anionic surfactants are those of the sulfonate and sulfate type. The apparatus according to the invention can be of particular significance for corresponding compounds of vegetable and/or animal origin.

Suitable surfactants of the sulfonate type are alkyl benzene-sulfonates ($C_{9-15}$ alkyl), olefin sulfonates, i.e. mixtures of alkene and hydroxyalkane sulfonates and the sulfonates obtained, for example, from $C_{12-18}$ monoolefins with a terminal or internal double bond by sulfonation with gaseous sulfur trioxide and subsequent alkaline or acidic hydrolysis of the sulfonation products. Other suitable surfactants of the sulfonate type are the alkanesulfonates obtainable from $C_{12-18}$ alkanes by sulfochlorination or sulfoxidation and subsequent hydrolysis or neutralization or by bisulfite addition onto olefins and, in particular, the esters of alpha-sulfofatty acids (ester sulfonates), for example the alpha-sulfonated methyl esters of hydrogenated coconut oil, palm kernel oil or tallow fatty acids.

Other important surfactant or emulsifier components in this connection are the so-called disalts which can be obtained by saponification of the above-mentioned alpha-sulfonated fatty acid methyl esters or by direction sulfonation of, in particular, saturated fatty acids, more particularly $C_{12-18}$ fatty acids. The apparatus according to the invention thus enables surfactants based on natural materials of the type described here and in the following to be industrially produced without difficulty in the form of dry free-flowing concentrates which have virtually unlimited shelf lives and which therefore make a significant contribution to the universally desired replacement of ABS.

Suitable surfactants of the sulfate type are the sulfuric acid monoesters of primary alcohols of natural and synthetic origin, i.e. of fatty alcohols, for example coconut fatty alcohols, tallow fatty alcohols, oleyl alcohol, lauryl, myristyl, palmityl or stearyl alcohol, or the $C_{10-20}$ oxoalcohols and those of secondary alcohols with the same chain length.

The sulfuric acid monoesters of the alcohols of natural and/or synthetic origin ethoxylated in particular with 1 to 6 mol ethylene oxide are also suitable components. Examples of synthesis alcohols are such compounds as 2-methyl-branched $C_{9-11}$ alcohols containing on average 3.5 mol ethylene oxide. Sulfated fatty acid monoglycerides are also suitable. The anionic surfactants may be present in the form of their sodium, potassium and ammonium salts and as soluble salts of organic bases.

Suitable nonionic surfactants are products of the addition of 1 to 40 and preferably 2 to 20 mol ethylene oxide onto 1 mol of an aliphatic compound essentially containing 10 to 20 carbon atoms from the group of alcohols, carboxylic acids, fatty amines, carboxylic acid amides or alkanesulfonamides.

Of particular importance are the addition products of 8 to 20 mol ethylene oxide onto primary alcohols, for example onto coconut oil or tallow fatty alcohols, onto oleyl alcohol, onto oxoalcohols or onto secondary alcohols containing 8 to 18 and preferably 12 to 18 carbon atoms. Besides the water-soluble nonionics, however, water-insoluble or incompletely water-soluble polyglycolethers containing 2 to 7 ethylene glycol ether units in the molecule are also of interest, particularly when they are used together with water-soluble, nonionic or anionic surfactants.

Other suitable nonionic surfactants are alkyl glycosides with the general formula R—O—(G)$_x$ where R is a primary, linear or branched aliphatic group containing 8 to 22 and preferably 12 to 18 carbon atoms, G stands for a glycose unit containing 5 or 6 carbon atoms and the degree of oligomerization x is between 1 and 10.

Suitable organic and inorganic builders are soluble and/or insoluble components showing a mildly acidic, neutral or alkaline reaction which are capable of precipitating or complexing calcium ions. Zeolites are suitable and, in particular, ecologically safe builders.

The zeolite used may be, for example, a finely crystalline synthetic zeolite containing bound water, such as zeolite A, zeolite P and mixtures of A and P. Zeolite MAP® (a Crosfield product) is an example of a commercially available zeolite P.

Other particularly suitable zeolites are faujasite zeolites. Together with zeolites X and Y, the mineral faujasite belongs to the faujasite types within zeolite structure group 4 which is characterized by the double 6-membered ring subunit D6R (cf. Donald W. Breck: "Zeolite Molecular Sieves", John Wiley & Sons, New York, London, Sydney, Toronto, 1974, page 92). Besides the faujasite types mentioned, the minerals chabasite and gmelinite and the synthetic zeolites R (chabasite type), S (gmelinite type), L and ZK-5 belong to zeolite structure group 4. The last two of these synthetic zeolites do not have any mineral analogs.

Faujasite zeolites are made up of β-cages tetrahedrally linked by D6R subunits, the β-cages being arranged similarly to the carbon atoms in diamond. The three-dimensional framework of the faujasite zeolites used in the process according to the invention has pores 2.2 and 7.4 Å in size. In addition, the elementary cell contains eight cavities each ca. 13 Å in diameter and may be described by the formula $Na_{86}[(AlO_2)_{86}(SiO_2)_{106}] \cdot 264\ H_2O$. The framework of the zeolite X contains a void volume of around 50%, based on the dehydrated crystal, which represents the largest empty space of all known zeolites (zeolite Y: ca. 48% void volume, faujasite: ca. 47% void volume). (All data from: Donald W. Breck: "Zeolite Molecular Sieves", John Wiley & Sons, New York, London, Sydney, Toronto, 1974, pages 145, 176, 177).

In the context of the present invention, the expression "faujasite zeolite" characterizes all three zeolites which form the faujasite subgroup of zeolite structure group 4. According to the invention, therefore, zeolite Y and faujasite and mixtures of these compounds may also be used in addition to zeolite X although pure zeolite X is preferred. Mixtures or co-crystallizates of faujasite zeolites with other zeolites, which do not necessarily have to belong to zeolite structure group 4, may also be used in accordance with the invention, preferably at least 50% by weight of the zeolites being faujasite zeolites.

Suitable aluminium silicates are commercially obtainable and the methods for their production are described in standard works.

Examples of commercially available X-type zeolites may be described by the following formulae:

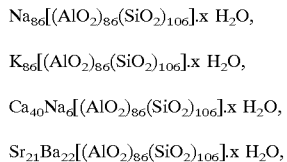

in which x may assume a value of 0 to 276 and which have pore sizes of 8.0 to 8.4 Å.

Another suitable zeolite is, for example, the zeolite A-LSX described in European patent application EP-A-816 291 which corresponds to a co-crystallizate of zeolite X and zeolite A and which, in its water-free form, has the formula $(M_{2/n}O+M'_{2/n}O) \cdot Al_2O_3 \cdot zSiO_2$, where M and M' may be alkali metals or alkaline earth metals and z is a number of 2.1 to 2.6. This product is commercially obtainable under the name of VEGOBOND AX from CONDEA Augusta S.p.A.

Zeolites of the Y type are also commercially obtainable and may be described, for example, by the following formulae:

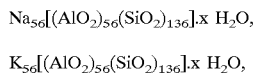

in which x is a number of 0 to 276. These zeolites have pore sizes of 8.0 Å.

The particle sizes of suitable faujasite zeolites are in the range from 0.1 to 100 μm, preferably in the range from 0.5 to 50 μm and more particularly in the range from 1 to 30 μm, as measured by standard particle size determination methods.

Other builder components which may be used in particular together with the zeolites are (co)polymeric polycarboxylates, such as polyacrylates, polymethacrylates and in particular copolymers of acrylic acid with maleic acid, preferably those containing 50% to 10% maleic acid. The molecular weight of the homopolymers is generally in the range from 1,000 to 100,000 and that of the copolymers in the range from 2,000 to 200,000 and preferably in the range from 50,000 to 120,000, based on free acid. A particularly preferred acrylic acid/maleic acid copolymer has a molecular weight of 50,000 to 100,000.

Other suitable compounds of this class are copolymers of acrylic acid or methacrylic acid with vinyl ethers, such as vinyl methyl ethers, in which the acid makes up at least 50%. Also suitable are polyacetalcarboxylic acids, such as those described for example in U.S. Pat. Nos. 4,144,226 and 4,146,495, and polymeric acids which are obtained by polymerization of acrolein and subsequent disproportionation with alkalis and which are made up of acrylic acid units and vinyl alcohol units or acrolein units.

Useful organic builders are, for example, the polycarboxylic acids preferably used in the form of their sodium salts, such as citric acid, and nitrilotriacetate (NTA), providing their use is not ecologically unsafe. In cases where a phosphate content is acceptable, phosphates—particularly pentasodium triphosphate and even pyrophosphates and orthophosphates which act primarily as precipitants for lime salts—may also be used.

Suitable inorganic, non-complexing salts are the bicarbonates, carbonates, borates or silicates of the alkali metals also known as washing alkalis. Of the alkali metal silicates, the sodium silicates above all ($Na_2O:SiO_2$ ratio 1:1 to 1:3.5) are suitable.

From the remaining groups of typical detergent ingredients, components from the classes of redeposition inhibitors (soil suspending agents), neutral salts and fabric softeners are particularly suitable for use in spray drying using the apparatus according to the invention.

Suitable redeposition inhibitors are, for example, carboxymethyl cellulose, methylhydroxyethyl cellulose and mixtures thereof.

A typical example of a suitable representative of the neutral salts is the already mentioned sodium sulfate.

Suitable softeners are, for example, swellable layer silicates of the corresponding montmorillonite type, for example bentonite.

Typical detergent ingredients sensitive to high temperatures, such as bleaching agents based on per compounds, enzymes from the class of proteases, lipases and amylases; or bacterial strains or fungi, stabilizers, perfumes, temperature-sensitive dyes and the like, are preferably mixed with the previously dried compositions.

The present invention also relates to a process for the spray drying of solvent-containing compositions, characterized in that a) a liquid or paste-form solvent-containing composition is heated to a temperature above the boiling point of the solvent, b) the heated liquid or paste-form solvent-containing composition is delivered to an atomizer under excess pressure and at a temperature above the boiling point of the solvent and c) the heated liquid or paste-form solvent-containing composition is sprayed under excess pressure by the atomizer into a relaxation space which is not under excess pressure at a temperature above the boiling point of the solvent.

In a particularly preferred embodiment, the process according to the invention is carried out using an apparatus according to the invention as described in the foregoing. FIG. 1 illustrates the invention as embodied in a flash evaporation apparatus and process. Solvent and solids are mixed in mixer (1) to form a liquid or paste-form composition, which is heated in heat exchanger (2) and transported under excess pressure and at a temperature above the solvent boiling point to spray dryer (3). At spray dryer (3), the composition is atomized by the spraying means (4) into the interior or relaxation space (5) of the dryer, which is at ambient pressure, evaporating at least part of the solvent. Hot gas (6) carries the atomized composition within the relaxation space (5), which is at a temperature exceeding the solvent boiling point.

The present invention also relates generally to the use of an apparatus according to the invention or a process according to the invention for the spray drying of suitable compositions and, more particularly, to the use of an apparatus according to the invention or a process according to the invention in the production, treatment and processing of foods; in the production of disinfectants or textile treatment compositions; in the production of pharmaceutical preparations, plant protection or plant treatment compositions, building materials or building aids, paints, lacquers, polymers, the ceramics industry and more particularly in the production of powder-form or granular laundry detergents, wetting agents and cleaners or of raw materials for laundry detergents, wetting agents or cleaners.

What is claimed is:

1. A process for the spray drying of solvent-containing compositions, comprising the steps of:

a) heating a liquid or paste-form solvent-containing composition to a temperature above the boiling point of the solvent;

b) delivering the heated liquid or paste-form solvent-containing composition to an atomizer under excess pressure and at a temperature above the boiling point of the solvent; and c) spraying the heated liquid or paste-form solvent-containing composition under excess pressure with the atomizer into a relaxation space that is not under excess pressure at a temperature above the boiling point of the solvent.

2. The process of claim 1, wherein the solvent is water.

3. The process of claim 2, wherein the temperature of the composition in step b) and the temperature in the relaxation space in step c) range between 100° C. and 240° C.

4. The process of claim 3, wherein the temperature of the composition in step b) and the temperature in the relaxation space in step c) range between 140° C. and 160° C.

5. The process of claim 2, wherein the excess pressure in step b) ranges from 5 to 60 bar.

6. The process of claim 5, wherein the excess pressure in step b) ranges from 20 to 50 bar.

7. The process of claim 6, wherein the excess pressure in step b) ranges from 30 to 40 bar.

* * * * *